(12) United States Patent
Heikkinen et al.

(10) Patent No.: US 7,394,833 B2
(45) Date of Patent: Jul. 1, 2008

(54) METHOD AND APPARATUS FOR REDUCING SYNCHRONIZATION DELAY IN PACKET SWITCHED VOICE TERMINALS USING SPEECH DECODER MODIFICATION

(75) Inventors: Ari Heikkinen, Tampere (FI); Ari Lakaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 1012 days.

(21) Appl. No.: 10/364,588

(22) Filed: Feb. 11, 2003

(65) Prior Publication Data

US 2004/0156397 A1    Aug. 12, 2004

(51) Int. Cl.
*H04J 3/06* (2006.01)
(52) U.S. Cl. .................................. 370/516; 704/241
(58) Field of Classification Search .................. None
See application file for complete search history.

(56) References Cited

U.S. PATENT DOCUMENTS

| 5,583,652 | A  | * | 12/1996 | Ware ........................... 386/75 |
| 5,704,003 | A  | * | 12/1997 | Kleijn et al. ................. 704/220 |
| 6,169,970 | B1 | * | 1/2001  | Kleijn ......................... 704/219 |
| 6,181,712 | B1 |   | 1/2001  | Rosengren ................... 370/474 |
| 6,223,151 | B1 | * | 4/2001  | Kleijn et al. ................. 704/207 |
| 6,259,677 | B1 |   | 7/2001  | Jain ............................. 370/252 |
| 6,452,950 | B1 |   | 9/2002  | Ohlsson et al. ............. 370/516 |
| 6,504,838 | B1 |   | 1/2003  | Kwan ........................... 370/352 |
| 6,879,955 | B2 | * | 4/2005  | Rao ............................. 704/241 |
| 7,110,416 | B2 | * | 9/2006  | Selin .......................... 370/433 |

2003/0043856 A1 * 3/2003 Lakaniemi et al. ........... 370/503

FOREIGN PATENT DOCUMENTS

| EP | 0 921 666 A2  |   | 6/1999  |
| WO | WO-01/11832 A1 |  | 8/2000  |
| WO | WO 02/087137  | * | 10/2002 |

OTHER PUBLICATIONS

Kleijn et al, Interpolation of the Pitch-Predictor Parameters in Analysis-by-Synthesis Speech Coders, IEEE, pp. 42-54.*

(Continued)

*Primary Examiner*—Frank Duong
(74) *Attorney, Agent, or Firm*—Harrington & Smith, PC

(57) ABSTRACT

A device is disclosed that makes packetized and encoded speech data audible to a listener, as is a method for operating the device. The device includes a unit for generating a synchronization request for reducing an amount of synchronization delay, and further includes a speech decoder that is responsive to the synchronization delay adjustment request for executing a time-warping operation for one of lengthening or shortening a duration of a speech frame. In one embodiment the speech decoder comprises a code excited linear prediction (CELP) speech decoder, and the CELP decoder time-warping operation is applied to a reconstructed excitation signal $u(k)$ to derive a time-warped reconstructed signal $u_w(k)$. The time-warped reconstructed signal $u_w(k)$ is input to a Linear Predictor (LP) synthesis filter to derive a CELP decoder time-warped output signal $\hat{y}_w(k)$. In another embodiment the speech decoder comprises a parametric speech decoder, and where an adaptation of the frame length N in the parametric speech decoder results in the use of a modified frame length $N_w$.

37 Claims, 7 Drawing Sheets

OTHER PUBLICATIONS

Liu et al, Adaptive Delay Concealment for Internet Voice Application with Packet-Based Time-Scale Modification, IEEE, pp. 1461-1464, 2001.*

Verheist, Overlap-Add Methods for Time-Scaling of Speech, University of Brussel, pp. 23, May 1999.*

Kleijn et al., "Speech Coding and Synthesis", 1995, Elsevier Science B.V., Chapter 4 pp. 121-173, Chapter 15 pp. 519-555.

Electronic Industries Alliance, "TR 45 TIA/EIA IS-641-A, TDMA Cellular/PCS—Radio Interface Enhanced Full-Rate Voice Codec, Revision A", STD.EIA TIA/IS-641-A-Engl 1998, pp. 1-79.

3rd Generation Partnership Project 2 "3GPP2", "Enhanced Variable Rate Codec (EVRC)", 3GPP2 C. S0014-0, Version 1.0, pp. i-C1.

E. Moulines and W. Verhelst, "Time-domain and frequency-domain techniques for prosodic modification of speech", Speech Coding and Synthesis, Editors W. B. Kleijn and K.K. Paliwal, pp. 519-556, Elsevier Science B. V., 1995.

TIA/EIA/IS-127, "Enhanced variable rate codec, speech service option 3 for wideband spread spectrum digital systems", Telecommunications Industry Association Draft Document, Feb. 1996

R. J. McAulay and T. F. Quatieri, "Sinusoidal coding", Speech Coding and Synthesis, Editors W. B. Kleijn and K.K. Paliwal, pp. 121-174, Elsevier Science B. V., 1995.

Kleijn et al., "Speech Coding and Synthesis", 1995, Elsevier Science B.V., Chapter 4 pp. 121-173, Chapter 15 pp. 519-555.

Electronic Industries Alliance, "TR 45 TIA/EIA IS-641-A, TDMA Cellular/PCS-Radio Interface Enhanced Full-Rate Voice Codec, Revision A", STD.EIA TIA/IS-641-A-Engl 1998, pp. 1-79.

3rd Generation Partnership Project 2 "3GPP2", "Enhanced Variable Rate Codec (EVRC)", 3GPP2 C. S0014-0, Version 1.0, pp. i-C1, 139 pages, 1999.

* cited by examiner $$H(z) = \frac{1}{A(z)} = \frac{1}{1 + a_1 z^{-1} + a_2 z^{-2} + \ldots + a_p z^{-p}}, \quad (1)$$

$$\frac{1}{B(z)} = \frac{1}{1 - bz^{-\tau}} \quad (2)$$

$$W(z) = \frac{1 + \sum_{l=1}^{P} a_l (\gamma_1 z)^{-l}}{1 + \sum_{l=1}^{P} a_l (\gamma_2 z)^{-l}}, \quad (3)$$

$$J(g, u_c) = \|x_2 - \hat{x}_2\|^2 = \|x_2 - gHu_c\|^2, \quad (4)$$

$$g = \frac{x_2^T H u_c}{u_c^T H^T H u_c}. \quad (5)$$

$$J(u_c) = x_2^T x_2 - \frac{(x_2^T H u_c)^2}{u_c^T H^T H u_c}. \quad (6)$$

$$s(t) = \mathrm{Re} \sum_{m=1}^{L(l)} a_m(t) \exp(j[\int_0^t \omega_m(t) dt + \Theta_m]), \quad (7)$$

$$s(n) = \sum_{m=1}^{L} A_m \cos(n \omega_m + \Theta_m), \quad 0 \le n < N, \quad (8)$$

$$\hat{s}(n) = \sum_{m=1}^{M} \hat{A}_m(n) \cos(\hat{\Theta}_m(n)), \quad (9)$$

$$s(n) = \sum_{m=1}^{L} A_m \cos(n \omega_m + \Theta_m), \quad 0 \le n < N_w, \quad (10)$$

FIG. 7

METHOD AND APPARATUS FOR REDUCING SYNCHRONIZATION DELAY IN PACKET SWITCHED VOICE TERMINALS USING SPEECH DECODER MODIFICATION

TECHNICAL FIELD

These teachings relate generally to methods and systems that process packetized audio data and, more particularly, these teachings pertain to systems and methods that receive and playback Internet Protocol (IP) speech or voice data packets, such as wireless communications terminals and personal computer (PC) based terminals.

BACKGROUND

It is well known in packet-based terminals and devices, such as wireless communications terminals (e.g., mobile and cellular telephones or personal communicators), PC-based terminals as well as IP telephony gateways, that an audio device requests data to be converted into audio at regular, fixed intervals. These intervals are not, however, synchronized to the reception of the data packets that contain the audio data. A given packet can contain one or more frames of data, where the length or duration of an audio signal contained within the frame is generally in the range of 20 ms to 30 ms (referred to herein generally as the "frame length", although a temporal measure is intended, not a spatial measure.) After reception, the audio data frame is typically stored into a jitter buffer to await its calculated playout time. The playout time is the time during which the frame of audio data is to be converted to an audio signal, such as by a digital-to-analog converter (DAC), then amplified and reproduced for a listener through a speaker or some other type of audio transducer. In the case of gateways and transcoders, the audio is typically sent to a sample-based circuit switched network. In that the audio device requests the frame data at random intervals, relative to the receipt of the audio packets, the data can be stored for a variable amount of time in the jitter buffer. The average storage time in the jitter buffer can be shown to be one half of the duration of the frame, in addition to the desired jitter buffer duration. For example, it can be demonstrated that if a packet resides in the jitter buffer first for a desired 10 ms, after which it is playable, the frame, however will be fetched at some time during the next 20 ms, resulting in the undesired average of 10 ms of additional storage time in the jitter buffer.

A problem arises because of the fact that in modern voice terminals and similar devices, such as IP telephony gateways, the audio device is synchronized to some local frequency source. The frequency source may be, for example, an oscillator or a telephone network clock signal. However, in packet-based terminals, the packets containing the voice data arrive at a rate that is independent of, and asynchronous to, the frequency source that drives the audio device. The difference between the rate of IP packet arrival and the rate at which the audio device requests frames of voice data can create an undesirable and variable end-to-end delay, also referred to as "synchronization delay", which can be as great as a packet length in duration. Voice-over-IP (VoIP) applications can be especially detrimentally affected by synchronization delay-induced problems.

Furthermore, due to slight differences in clock rates this difference between the rate of IP packet arrival and the rate at which the audio device requests frames of voice data can vary over time, thus constituting a continuous re-synchronization problem. Typically, transmitter and receiver clocks running at different frequencies repeatedly introduce an underflow or overflow situation in the jitter buffer of a VoIP receiver. Because even short gaps or discontinuities in the audio playback cannot be tolerated, the receiver needs to somehow react to this condition. In practice, the receiver needs to perform re-synchronization, either by artificially generating a short segment of extra signal in the case of underflow, or by discarding some of the received signal in the case of overflow. However, the synchronization process should be performed with great care in order to avoid generating audible discontinuities in the reconstructed speech signal.

In EP 0 921 666 A2 Ward et al. are said to reduce degradation in packetized voice communications that are received by a non-synchronized entity from a packet network by adjusting a depth of storage of a jitter buffer in the receiver. Units of voice sample data are stored in the jitter buffer as they are received. From time to time the rate of extraction of the stored units from the jitter buffer is accelerated by extracting two units, but delivering only one, or is retarded by not extracting a unit, while delivering a substitute unit in its place. This technique is said to control the depth of storage in response to packet reception events such that the delay is minimized, while providing a sufficient amount of delay to smooth the variances between packet reception events.

In WO 01/11832 A1 Nakabayashi describes the use of a receive buffer that stores packets received from a network interface, and a reproduction controller that refers to the state of the receive buffer to carry out a sound reproduction operation. A decoder receives the stored data, and the decoded data is provided to a DAC that is clocked by a reproduce clock. The process is said to prevent to the underflow and overflow of the receive buffer due to clock differences between the transmitter and the receiver, and to prevent packet jitter that results in sound dropouts.

In U.S. Pat. No. 6,181,712 B1 Rosengren describes transmitting packets from an input stream to an output stream. When multiplexing transport streams, packet jitter may be introduced to the extent that decoder buffers can underflow or overflow. To avoid this, a time window is associated with a data packet and position information is provided in the packet concerning the position of the packet within the window.

The foregoing prior art techniques do not provide an adequate solution to the synchronization delay problem in VoIP and other applications.

Commonly assigned U.S. patent application Ser. No. 09/946,066, filed Sep. 4, 2001, entitled "Method and Apparatus for Reducing Synchronization Delay in Packet-Based Voice Terminals", by Jari Selin, describes a system and method wherein synchronization is performed-at the start of a talk spurt, and not continuously.

Commonly assigned U.S. patent application Ser. No. 10/189,068, filed Jul. 2, 2002, entitled "Method and Apparatus for Reducing Synchronization Delay in Packet-Based Voice Terminals by Resynchronizing During Talk Spurts", by Ari Lakaniemi, Jari Selin and Pasi Ojala, which is a continuation-in-part of the foregoing application, describes a method that operates, when a frame containing audio data is sent to a decoder, by measuring the synchronization delay, determining by how much the synchronization delay should be adjusted and adjusting the synchronization delay in a content-aware manner by adding or removing one or more audio samples in a selected current frame, or in a selected subsequent frame, so as not to significantly degrade the quality of the played back audio data. When the synchronization delay is adjusted by more than one audio sample, the adjustment can be made by all of the determined audio samples in one adjustment, or the adjustment can be made by less than all of the determined audio samples by using a plurality of adjustments. The adjusting operation selects, if possible, an unvoiced frame and discriminates against a transient frame. The determining operation can include measuring an average amount of time that a frame resides in the jitter buffer, and adjusting the synchronization delay so that the average duration approaches a desired jitter buffer residency duration.

While the two foregoing approaches provide a significant advance over the prior art, it would be desirable to even further enhance the ability of a packet-based terminal to overcome the problems related to synchronization delay in order to even further improve the quality of audio delivered to a user.

SUMMARY OF THE PREFERRED EMBODIMENTS

The foregoing and other problems are overcome, and other advantages are realized, in accordance with the presently preferred embodiments of this invention.

This invention provides a system and method for performing synchronization and re-synchronization through the use of a modified speech decoder. The invention is described in the context of examples drawn from two widely used, but non-limiting, speech coding models, including code excited linear prediction (CELP) and parametric coding. In the modified CELP speech decoder, a time-warping method is exploited to enable a best possible speech quality to be realized as well during the synchronization process. In the parametric coding embodiment, an adaptation of the speech decoder frame length is used for synchronization purposes.

An aspect of this invention is to provide a new method for speech coding. According to prior-art solutions, the synchronization operation was required to wait for either the next speech pause, or the next speech frame that is classified to be suitable for synchronization. While the latter case may provide a relatively fast reaction time for a synchronization request, the resulting speech quality is dependent on the frame classification algorithm deciding when the synchronization operation is allowed to occur. Such an algorithm may represent a trade-off between providing a fast reaction to a synchronization request and the resulting speech quality. For example, a typical voiced speech segment can have a duration that exceeds 100 msec, and can extend over several consecutive speech frames. However, shortening or lengthening a voiced frame, having a clear periodic structure, runs the risk of disturbing the periodicity, which can result in an audible distortion of the processed signal.

The teachings of this invention, however, enable the synchronization delay to be adapted both with a fast reaction time to a synchronization need or request, and with improved speech quality. The synchronization can be performed during any frame, as the time-warping technique enables the processing of periodic voiced frames without degrading the speech quality. Furthermore, the use of the time-warping technique provides a flexible approach to selecting a most suitable adaptation step length, without inducing distortion into the processed speech. The implementation cost is also low.

A device is disclosed that makes packetized and encoded speech data audible to a listener, as is a method for operating the device. The device includes a unit for generating a synchronization request for reducing an amount of synchronization delay, and further includes a speech decoder that is responsive to the synchronization delay adjustment request for executing a time-warping operation for one of lengthening or shortening a duration of a speech frame. In one embodiment the speech decoder comprises a code excited linear prediction (CELP) speech decoder, and the CELP decoder time-warping operation is applied to a reconstructed excitation signal u(k) to derive a time-warped reconstructed signal $u_w(k)$. The time-warped reconstructed signal $u_w(k)$ is input to a Linear Predictor (LP) synthesis filter to derive a CELP decoder time-warped output signal $\hat{y}_w(k)$. In another embodiment the speech decoder comprises a parametric speech decoder, where an adaptation of the frame length N in the parametric speech decoder results in the use of a modified frame length $N_w$.

The synchronization delay may be adjusted incrementally over a plurality of frames, or the synchronization delay can be adjusted during one frame.

The device could be a cellular telephone or a personal communicator, where the packetized encoded speech data is received through a wireless communications channel. The packetized encoded speech data maybe used for a voice over IP (VoIP) application.

The device includes a jitter buffer for storing speech data and a jitter buffer controller, and the unit that generates the synchronization delay adjustment request comprises the jitter buffer controller. The jitter buffer controller may determine an average amount of time that a frame resides in the jitter buffer; and can then adjust the synchronization delay so that the average duration approaches a desired jitter buffer residency duration.

The unit that generates the synchronization request may, where possible, cause the synchronization delay to be adjusted during subjectively less important speech segments, such as during an unvoiced frame.

BRIEF DESCRIPTION OF THE DRAWINGS

The foregoing and other aspects of these teachings are made more evident in the following Detailed Description of the Preferred Embodiments, when read in conjunction with attached Drawing Figures, wherein:

FIG. 7 shows the Equations (1) through (10) that are referred to in the description.

DETAILED DESCRIPTION OF THE PREFERRED EMBODIMENTS

It is noted at the outset that these teachings are applicable to any system or apparatus that processes and plays back packetized (or framed) audio data, such as mobile and cellular telephones, personal communicators, PC-based terminals, IP telephony gateways and IP-to-circuit switched media transcoders. VoIP systems and devices can especially benefit from the use of this invention. These various types of devices and systems may all be referred to herein simply as a terminal. In general, the teachings in accordance with this invention are applicable to any device that links packet-based or packet-switched voice to circuit switched or otherwise continuous voice. Hence, the method of this invention is also applicable to these various devices, including gateways and transcoders linking IP and PCM links.

It should further be noted that the description of this invention is made in the context of a media subsystem that employs the real-time transport protocol (RTP) which, currently, is widely used for VoIP applications. However, the teachings of this invention are not limited for use with an RTP-based system. In general, this invention may be practiced with any suitable system that provides functionality for at least accommodating a sequence numbering of packets, a time-stamping of packets, and some type of packet payload identification. Thus, while the ensuing description of the presently preferred embodiments of this invention will be made using RTP, those skilled in the art should appreciate that the use of RTP is exemplary, and is not to be read or construed in a limiting sense upon the practice of this invention.

Figure 1:
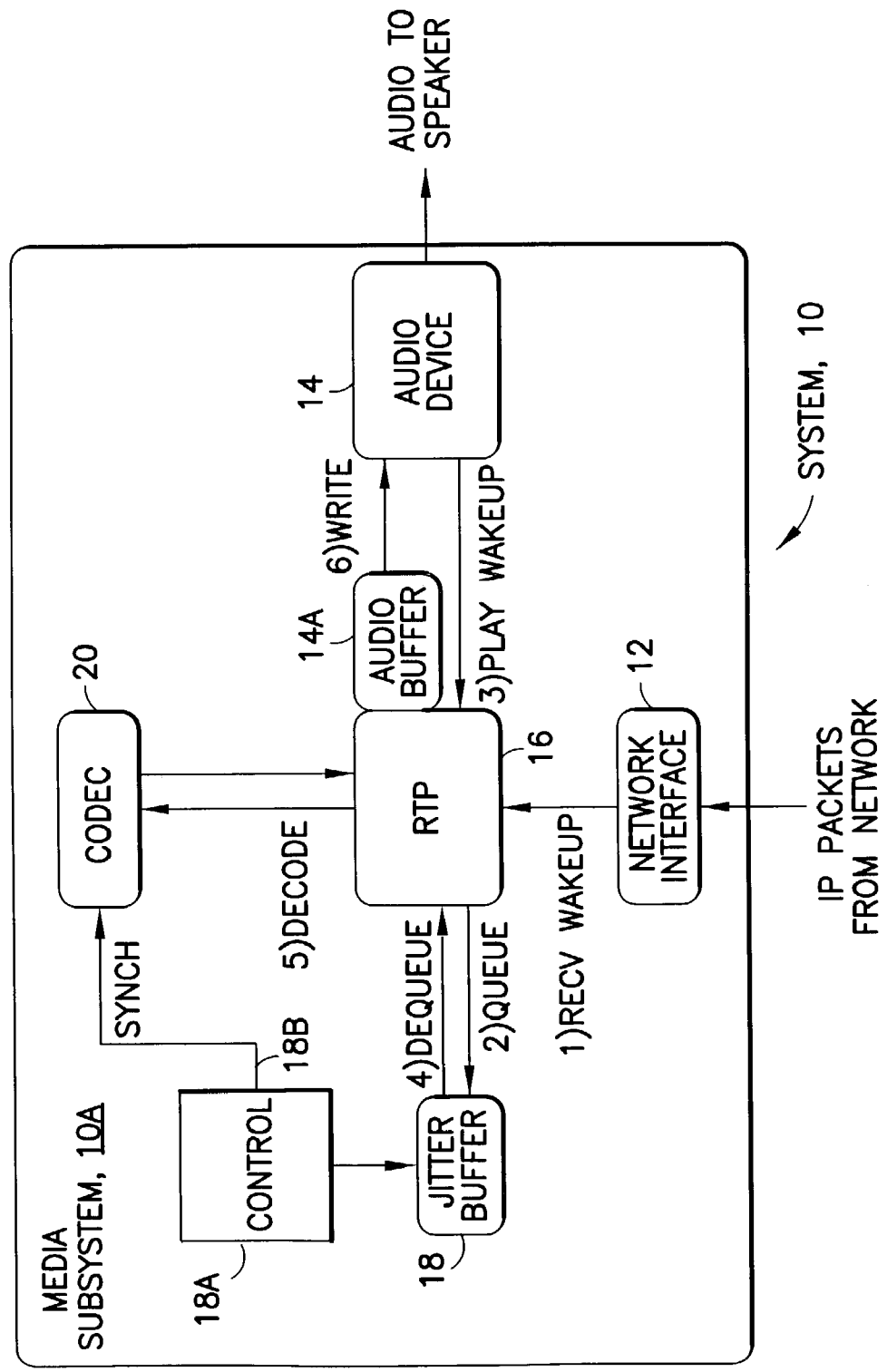
FIG. 1 is a simplified block diagram of a media subsystem of an audio reproduction system, and also depicts media flow during audio data packet reception and playback.

By way of introduction, FIG. 1 is a simplified block diagram of a media subsystem 10A of an audio reproduction system 10, and also depicts the media flow during audio reception. While described primarily in the context of a wireless communication device, such as a cellular telephone or a personal communicator, it should be appreciated that the system 10 can also be, by example and not by way of limitation, a PC-based terminal or an IP telephony gateway. Packets, such as Internet Protocol (IP) packets, arrive at a network interface 12 from a physical layer, in this case some type of packet-switched media or network, such as a dial-up telephone line, an Ethernet connection, or a wireless air interface (e.g., the packets are modulated onto an RF carrier or onto an optical carrier). The network interface 12 may also be referred to as the IP stack of the system 10. The time of arrival of individual packets at the network interface 12 is not synchronized with the operation of an audio device 14, which may be, by way of example only, a DAC of a mobile telephone, or the PCM connection of an IP telephony gateway. The audio device 14 may implement one of a number of different interfaces such as, but not limited to a Linux audio API (application programming interface), a Windows audio API, or a PCM line card.

In the illustrated, non-limiting embodiment, when a packet arrives at the network interface 12 the media subsystem 10A receives a callback (1), and the packet is received by a real-time transport protocol (RTP) module 16. Reference with regard to RTP may be had to H. Schulzrinne, S. Casner, R. Frederick and V. Jacobson, RTP: a transport protocol for real-time applications, IETF Network Working Group, RFC 1889, Standards Track, January 1996, 75 p. and to H. Schulzrinne, RTP Profile for Audio and Video Conferences with Minimal Control, IETF Network Working Group RFC 1890, Standards Track, January 1996, 18 p. Playout times for the frames contained within the packet are calculated. In a next step (2) the RTP module 16 inserts or queues the frames into a jitter buffer 18. When the audio device 14 begins to run out of data to play, it wakes up or interrupts the media subsystem 10A (3) and makes a request to the RTP module 16 for more data to play. In response, the RTP module 16 checks to determine if there is a sufficient amount of speech data in its internal audio buffer to fill the audio device buffer. If there is enough data, it is written immediately to the audio device (jump to step 6). The dequeued frame is then sent to an audio codec 20 such as, but not limited to, a PCM codec, a G.711 codec (Pulse code modulation (PCM) of voice frequencies, ITU-T Recommendation G.711, 1972, 18 p.), a G.723.1 codec (Dual rate speech coder for multimedia communications transmitting at 5.3 and 6.3 kbit/s, ITU-T Recommendation G.723.1, March 1996, 27 p.), or an AMR codec (Mandatory speech codec speech processing functions. AMR speech codec; transcoding functions, 3GPP Technical specification Group Services and System Aspects, 3G TS 26.090 V3.0.1, September 1999, 61 p.), which decodes the audio data and returns a decoded audio data frame to the RTP module 16 at step (5). The various codecs 20 that are useable by the apparatus and method of these teachings may or may not have a voice activity detection (VAD) function.

As will be described below, in the preferred embodiments of this invention the codec 20 includes at least one of a AbS-type speech decoder, such as a CELP speech decoder, or a sinusoidal model, parametric type of speech decoder that are modified to implement, on demand, a time-warping operation for adjusting the length of a speech frame and, hence, adjusting the synchronization delay.

If there was no data to decode in the jitter buffer 18, comfort noise or error concealment data may be generated, depending on codec type and internal state. At step (6), the RTP module 16 writes the audio data to the audio device 14, and the media subsystem 10A then returns to the sleep state to wait for the next wakeup.

In general, the audio device 14 requests data representing playable sound at regular intervals, such as every 20 ms (i.e., the codec 20 frame rate). However, the reception of the IP packets from the packet network is not synchronized to the play wakeups generated by the audio device 14. More particularly, the audio device 14 typically will process audio in blocks of data that are the same length as the frame length of the codec 20, such as 20 ms. This results in an average synchronization delay of about one half of the frame length. For example, if the average frame length is 20 ms, then the average synchronization delay is about 10 ms.

Before discussing this invention in greater detail, it will be useful to first review the two (currently) most important speech coder types: i.e., one based on waveform coding and one based on parametric coding. The concepts of CELP coding, time warping and parametric coding are then described.

Speech coding algorithms can be categorized in different ways depending on the criterion used. The most common classification of speech coding systems divides them into the two main categories of waveform coders and parametric coders. The waveform coders, to which the CELP coder belongs, attempt to directly preserve the waveform being coded without considering in any significant detail the characteristics of the speech signal. Thus, in waveform coders the reconstructed signal converges toward the original signal with decreasing quantization error.

This "perfect" reconstruction property is not necessarily true for parametric coders, which instead use a priori information concerning the speech signal obtained from different speech models, and attempt to preserve the perceptually most important characteristics of speech rather than attempting to faithfully code the actual speech waveform. In parametric coders the reconstruction error does not converge to zero with decreasing quantization error. Parametric coders may also be referred to as source coders or vocoders.

It should be noted that an active speech signal can be classified into different sub-categories. A typical classification would be a division into voiced (periodic) and unvoiced (noise-like) frames. However, usually the transition between unvoiced and voiced speech introduces a third classification category of a transient frame. Furthermore, one may consider as a fourth classification category a so-called onset frame, which means the frame contains the start of an active speech period following a non-active (or low-energy) speech period.

As such, it is within the scope of this invention to selectively perform the speech decoder-based time-warping operation for adjusting the synchronization delay based at least in part on the type of frame, or on the speech frame content, with adjustments being made during, for example, unvoiced frames, where possible. In the presently preferred embodiments it is generally not preferred to perform synchronization during transient or onset frames, although these types of frames may include unvoiced or low-energy speech, and may thus be suitable for synchronization in some cases.

Figure 2:
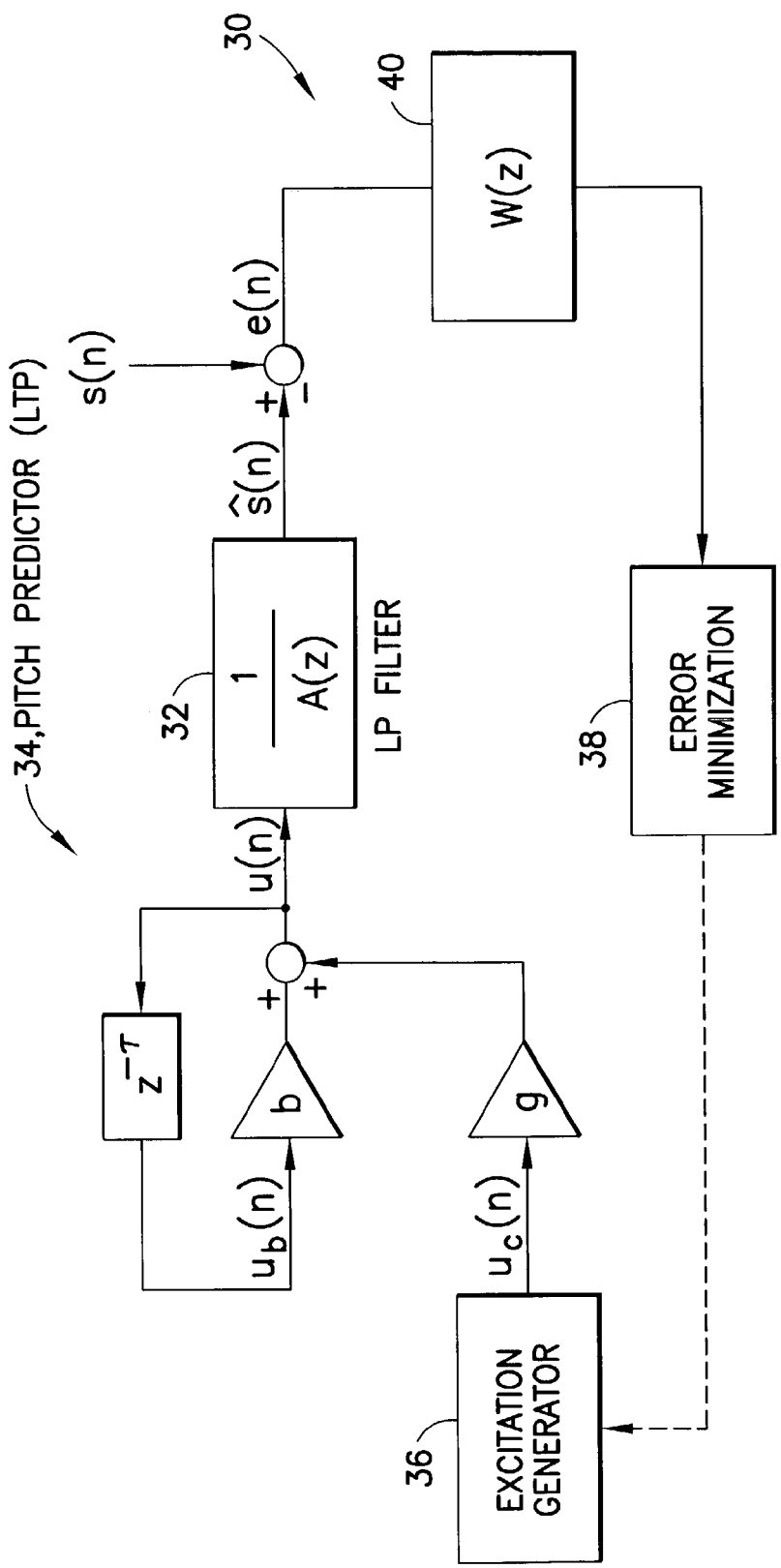
FIG. 2 is a block diagram of a conventional code excited linear prediction (CELP) speech encoder.

Referring to FIG. 2, a CELP coder 30 is basically an Analysis-by-Synthesis (AbS) hybrid coder that utilizes vector quantization. In the CELP coder a cascade of a time variant pitch predictor and LP filter is used. An all-pole LP filter 32 has the form shown in Equation (1) in FIG. 7, where $a_1 \ldots a_p$ are the coefficients, is used to model the short-time spectral envelope of the speech signal. A pitch predictor 34 has the form shown in Equation (2) of FIG. 7, utilizes the pitch periodicity of speech to model the fine structure of the spectrum. Typically, the gain b is bounded to the interval approximately of 0-1.2, and the pitch period, or similarly pitch lag, $\tau$ to the interval approximately of 20-140 samples (assuming by way of example a typical sampling frequency of 8 kHz). The pitch predictor 34 may also be referred to as long-term predictor (LTP) filter.

In FIG. 2 the LTP filter 34 is represented by the feedback loop containing the delay $z^{-\tau}$ and the gain. The LTP memory may also be viewed as a codebook consisting of overlapping code vectors. The codebook is typically referred to as the LTP codebook, or as the adaptive codebook.

An excitation signal $u_c(n)$ is produced by an excitation generator 36, which typically is a codebook of different candidate vectors representing the noise-like component in speech. The excitation signal is multiplied by a gain g to form an input signal to the LTP/LP filter cascade. The codebook is often referred to as a stochastic or fixed codebook. The output of the filter cascade is a synthesized speech signal sˆ(n). In the encoder, an error signal e(n) is computed by subtracting the synthesized speech signal sˆ(n) from the original speech signal s(n), and an error minimizing procedure, represented by error minimization block 38, is employed to select the best excitation signal provided by the excitation generator 36. Typically a perceptual weighting filter 40 is applied to the error signal prior to the error minimization procedure. The purpose of the weighting filter 40 is to shape the spectrum of the error signal so that it is less audible. This can be achieved by emphasizing the error in the spectral valleys of the input speech, and by de-emphasizing the error in the regions of formant peaks. A typical weighting filter 40 is derived from the LP filter coefficients in the manner shown in Equation (3) of FIG. 7, where $\gamma_1$ and $\gamma_2$ are parameters that control the weighting as a function of frequency. The values of $\gamma_1$ and $\gamma_2$ are usually between 0 and 1, and they may be made fixed or adaptive.

Figure 3:
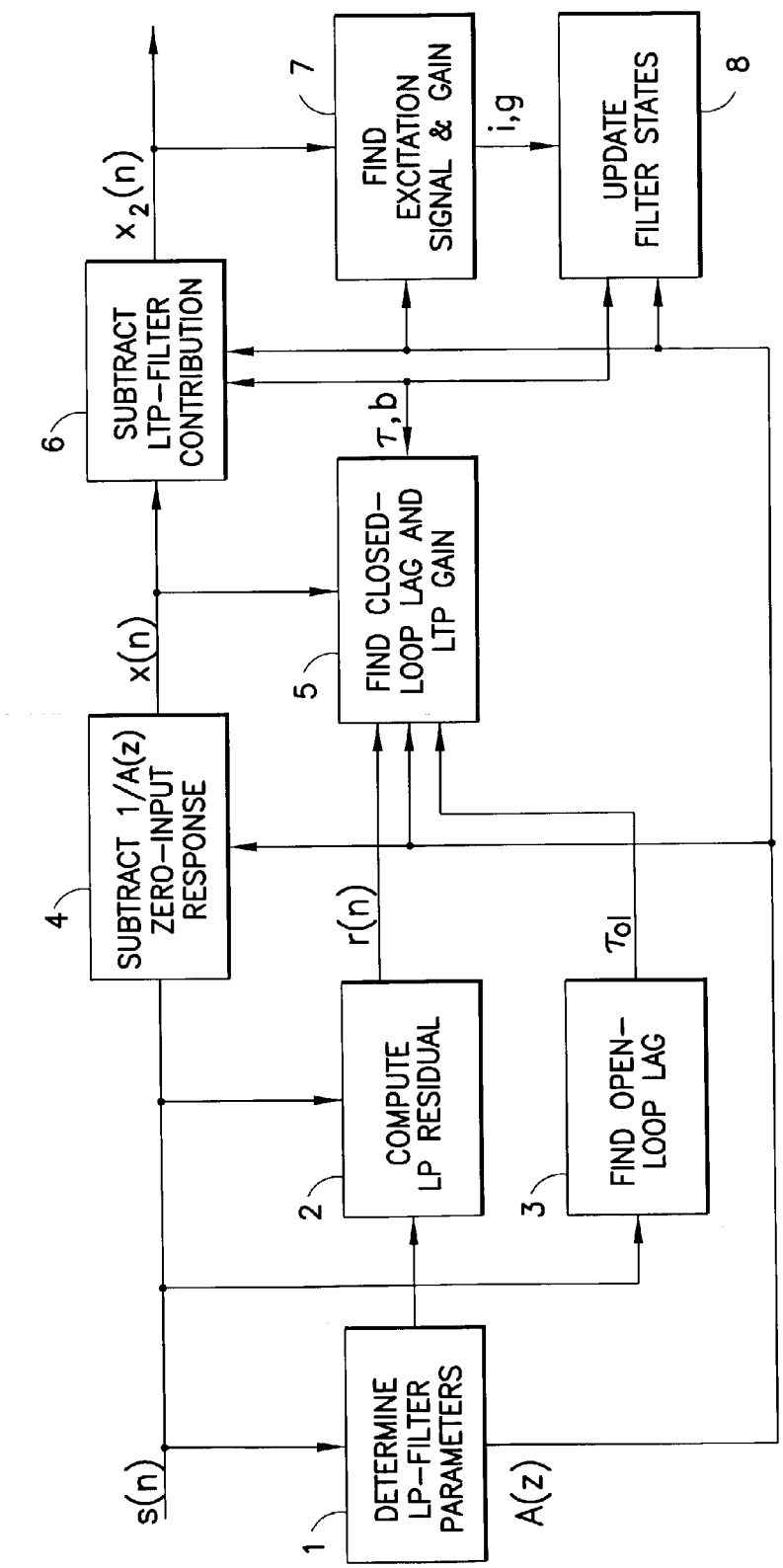
FIG. 3 is a flow diagram showing the encoding procedure executed by the CELP encoder of FIG. 2.

A schematic diagram of the encoding procedure is shown in FIG. 3. This diagram is derived from an IS-641 coder, TIA/EIA/IS-641, "TDMA Cellular/PCS—Radio Interface—Enhanced Full-Rate Speech Codec", Telecommunications Industry Association/Electronic Industry Association/Interim Standard 641, Global Engineering Documents, 1996, which is an example of a high-quality CELP coder. The blocks are numbered in their order of execution, but all blocks are not necessarily executed in every subframe. For example, in the IS-641 coder the frame is divided into four subframes. LP filter parameters are determined once per frame, the open-loop lag is determined twice per frame, and the closed-loop lag, the LTP gain, the fixed codebook excitation signal and its gain are all determined four times per frame.

The time-sequence operation of the CELP coder shown in FIG. 3 is as follows.

(1) Coefficients of the LP filter 32 are determined based on the input speech signal. Usually the speech signal is windowed, and the LP filter coefficients are determined using, e.g., the Levinson-Durbin algorithm. In most coders the coefficients are interpolated sub-frame wise.

(2) The input speech is filtered with A(z) to produce the residual signal r(n), which may sometimes be referred to as the ideal excitation.

(3) The open-loop pitch lag $\tau_{ol}$ is determined by finding the delay value that gives the highest auto-correlation value for the speech signal. In most coders, the speech signal is appropriately weighted with a prior pitch estimation to improve the performance.

(4) A target signal x(n) for the closed-loop lag search is computed by subtracting the zero input response of the LP filter 32 from the speech signal. This takes into account the effect of the initial states of the LP filter 32.

(5) A closed-loop lag $\tau$ and gain b are searched by minimizing the weighted sum-squared error between the target signal and the synthesized speech signal. A closed-loop lag is searched around the open-loop lag value. Typically, fractional resolution is used in the closed-loop pitch lag search while integer resolution is used in the open-loop lag search. For lag values less than the sub-frame length, the LTP memory has to be extended. This can be done by using the residual signal, or by copying the prior LTP excitation. The implementation of the weighting filter is omitted from FIG. 3. The weighting can be done directly for the resulting error signal in the search procedure, or alternatively the weighting can be done both to the target signal and to the synthesis filter in order to reduce computational complexity.

(6) The target signal $x_2(n)$ for the fixed codebook excitation search is computed by subtracting the contribution of the LTP filter 34 from the target signal of the closed-loop lag search.

(7) The fixed codebook excitation signal (codebook index i) and its gain g are searched by minimizing the weighted sum-squared error between the target signal and the synthesized speech signal. Typically heuristic rules are employed to avoid an exhaustive search of all possible excitation signal candidates.

(8) Finally, the filter states in the encoder are updated to keep them consistent with the filter states in the decoder.

Turning now to the AbS procedure for finding the fixed codebook excitation with the corresponding gain value, this is accomplished by minimizing the criterion shown in Equation (4) of FIG. 7, in matrix notation, where $x_2$ is a target vector containing the $x_2(n)$ samples over the search horizon, $\hat{x}_2$ is the corresponding synthesized signal, and $u_c$ the excitation vector corresponding the fixed codebook excitation sequence. H is the weighted impulse response matrix of the LP filter, and g is the gain. The same method is also applied for the adaptive codebook search by replacing g by b, $u_c$ by $u_b$, and $x_2$ by x, respectively. The optimal gain can be found by setting the partial derivative of the cost function with respect to the gain equal to zero, as shown in Equation (5) of FIG. 7. By substituting Equation (5) into Equation (4), the expression shown in Equation (6) of FIG. 7 is obtained. The optimal excitation is typically searched by maximizing the latter term of Equation (6).

Figure 4:
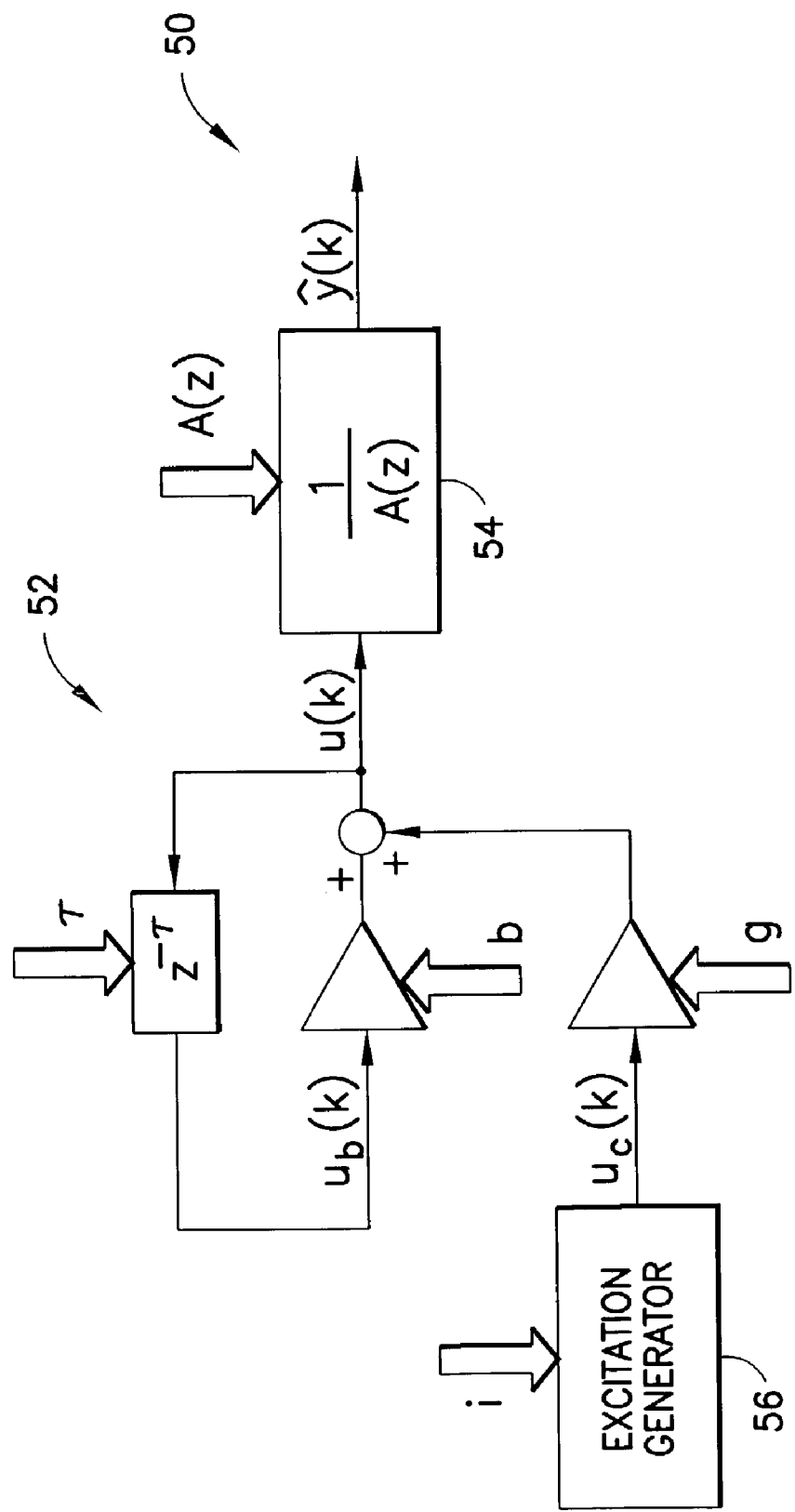
FIG. 4 is a block diagram of a conventional CELP speech decoder.

The encoded parameters of the described CELP structure include LP filter coefficients, pitch and pitch gain, and the fixed codebook index together with its gain. The CELP decoder 50 receives the parameters from the channel, as shown in FIG. 4, and a decoder excitation generator 56 determines the fixed excitation signal by the received index and gain. The fixed excitation signal is filtered through the LTP-LP filter cascade 52, 54 to produce the synthesized speech signal. The CELP decoder 50 may also include a postfilter (not shown) to enhance the perceptual speech quality.

Figure 5:
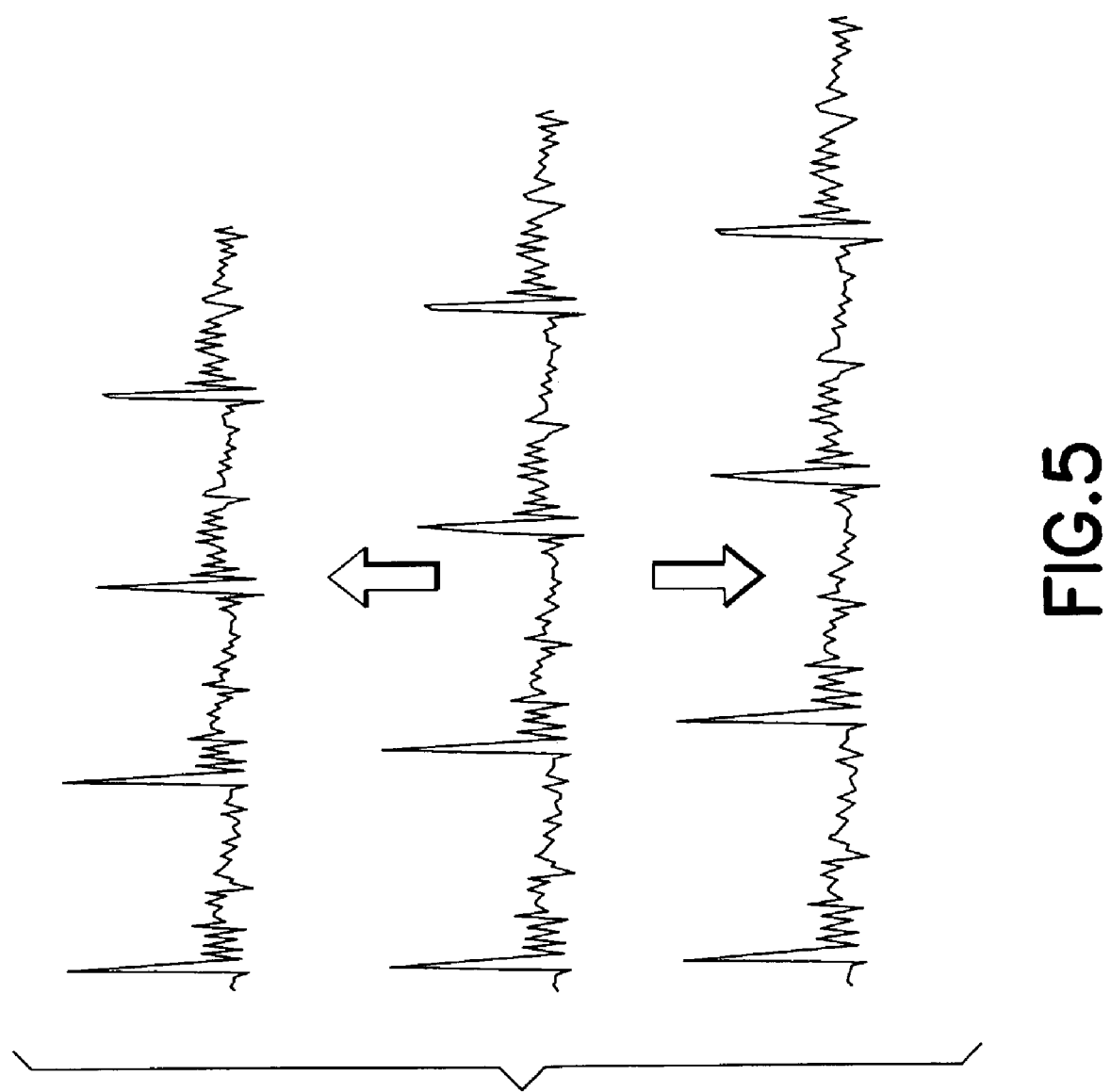
FIG. 5 are waveform diagrams that illustrate the time-warping of a signal.

In the context of this invention, "time warping" refers to a modification of a signal segment in such a way that its length is either shortened or lengthened in time. FIG. 5 shows an example of time warping of an original signal (middle trace) to a resultant, compressed time warped signal (top trace) or to a resultant, expanded time warped signal (bottom trace). In general, a number of speech processing applications such as, for example, shortening the duration of original speech messages in a telephone answering machine, rely on time warping of the original signal. For high-quality time warping, a number of algorithms have been proposed. Many of these algorithms use an overlap-add principle, either in the speech or the LP residual domain. Reference in this regard may be had to, for example, E. Moulines and W. Verhelst, "Time-domain and frequency-domain techniques for prosodic modification of speech", Speech Coding and Synthesis, Editors W. B. Kleijn and K. K. Paliwal, pp. 519-556, Elsevier Science B.V., 1995.

In the TIA Enhanced Variable Rate Coder (EVRC), portions of the LP residual signal are either omitted or repeated in order to obtain the desired time warp. Reference in this regard can be had to TIA/EIA/IS-127, "Enhanced variable rate codec, speech service option 3 for wideband spread spectrum digital systems", Telecommunications Industry Association Draft Document, February 1996. The time-warped speech signal is then obtained by filtering the modified residual signal through an LP synthesis filter. During voiced speech, the omitting or repeating of speech samples is performed during low-energy portions of the signal in order to avoid a perceptual quality degradation in the modified speech.

Turning now to sinusoidal coding, it is well known that most parametric coders are based on a sinusoidal coding model where the speech signal, or alternatively the LP residual signal, is represented by a sum of sine waves of arbitrary amplitudes, frequencies and phases. Reference in this regard can be had to R. J. McAulay and T. F. Quatieri, "Sinusoidal coding", Speech Coding and Synthesis, Editors W. B. Kleijn and K. K. Paliwal, pp. 121-174, Elsevier Science B.V., 1995. Referring also to Equation (7) in FIG. 7, the basics of sinusoidal coding are shown, where, for the mth sinusoidal component, $a_m$ and $\omega_m(t)$ represent the amplitude and frequency, respectively, and $\theta_m$ represents a fixed phase offset. To obtain a frame-wise representation, the parameters are assumed to be constant over the analysis. Thus, the discrete signal s(n) in a given frame is approximated by the expression shown in Equation (8) in FIG. 7, where $A_m$ and $\theta_m$ represent the amplitude and phase, respectively, of each sine-wave component associated with the frequency track $\omega_m$, L is the number of sine-wave components, and N is the frame length.

In order to achieve a smoothly evolving synthesized speech signal, during sinusoidal coding a proper interpolation of the parameters is required to avoid discontinuities at the frame boundaries between successive frames. For amplitudes, linear interpolation is widely used, while the evolving phase may be interpolated using a cubic polynomial between the parameter pairs in succeeding frames. The interpolated frequency can be computed as a derivative of the phase function. Thus, the resulting sinusoidal model can be defined as shown in Equation (9) in FIG. 7, where $\hat{A}_m$ and $\hat{\theta}_m$ represent the interpolated amplitude and phase contours, respectively.

Having thus provided a background description of both CELP and sinusoidal (parametric) speech coding techniques, in accordance with a CELP speech coding embodiment of this invention it is now shown that a time-warping technique, executed by the CELP speech decoder, can be used to perform the desired synchronization in a packet switched terminal that receives speech or audio data from a channel. The approach of this invention enables synchronization to be achieved during periods of active speech, regardless of the nature of the current speech signal, and thus does not assume that synchronization will be performed only during a certain type or types of speech.

For the purposes of this invention it can be assumed that the synchronization process is controlled by an external device, e.g. as in FIG. 1, a jitter buffer controller 18A, that requests (via a SYNCH delay adjustment request line 18B) the speech decoder portion of the codec 20 to perform the synchronization or re-synchronization operation, either by shortening or lengthening the temporal duration of a frame. Once a synchronization request is made, when decoding the next speech frame the decoding algorithm of the speech decoder of the codec 20 is modified in such a way that the time-warped and synthesized signal is aligned with the synchronization information. 10.

As one example, the jitter buffer controller 18A may determine an average amount of time that a frame resides in the jitter buffer 18, and the adjustment to the synchronization delay is made so that the average duration approaches a desired jitter buffer residency duration.

However, during the time-warping process a direct modification to the decoded LP residual signal u(k) in FIG. 4 would result in a significant quality degradation due to the feedback loops in the LP and LTP filters 52 and 54. This is especially true for the long-term predictor (LTP) filter 54 during voiced speech. One reason for the quality degradation is the parameter optimization process in the speech encoder 30 (FIG. 2), which minimizes in block 38 the squared error between the original signal and the signal generated by the LTP and fixed codebooks. After the time-warping process in only the speech decoder 50, there would exist a misalignment between the encoded parameters and the reconstructed excitation signal.

Figure 6:
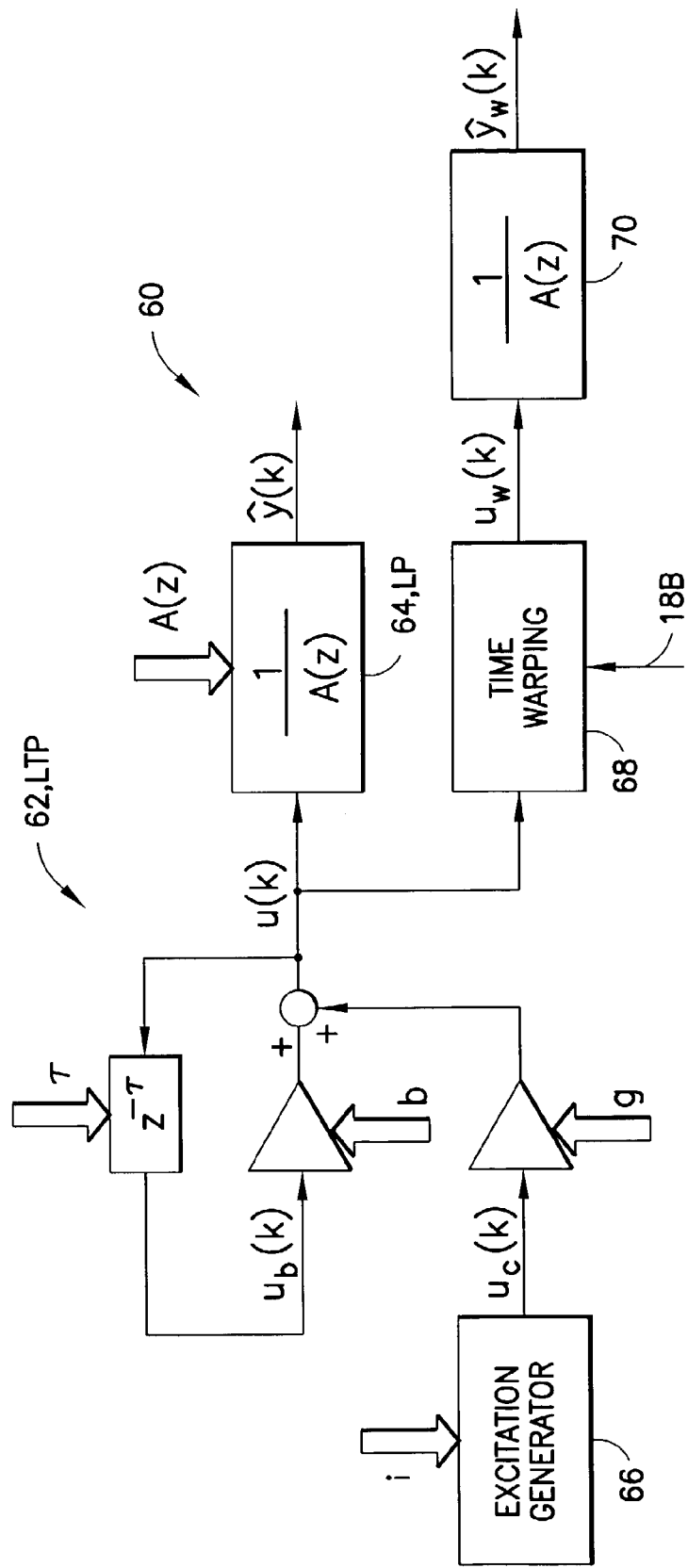
FIG. 6 is a block diagram of an embodiment of a CELP speech decoder that executes time-warping on-demand for achieving synchronization and re-synchronization of a packet-based speech signal.

To avoid the quality degradation during all segments of speech, the speech decoder 60 shown in FIG. 6 is presently preferred for use. Note that in this case the speech decoder 60 is used in place of the speech decoder that forms a part of the codec 20 in FIG. 1. Similar to the conventional CELP decoder 50 shown in FIG. 4, the improved CELP decoder 60 receives the parameters from the channel, and a decoder excitation generator 66 determines the fixed excitation signal by the received index and gain. The fixed excitation signal is filtered through the LTP-LP filter cascade 62, 64 to produce the synthesized speech signal.

In the presently preferred CELP speech decoder 60, the reconstructed signals u(k) and $\hat{y}$(k) are used to update the LTP and LP filter memories. The time-warping procedure is applied to u(k), when requested by the SYNCH delay adjustment request signal 18B (see FIG. 1), in a time-warping block 68 to derive $u_w(k)$, which is modified according to the synchronization information. The time-warped signal $u_w(k)$ is then fed through a second LP synthesis filter 70 to derive the decoder 60 time-warped output signal $\hat{y}_w(k)$, which may be input to an postfilter (not shown). In the preferred embodiment the filters $\hat{y}$(k) and $\hat{y}_w(k)$ have their own (separate) memories.

The total amount and direction of the required synchronization (to be performed by time-warping block 68) is determined from the jitter buffer 18, and is indicated by the signal 18B (see FIGS. 1 and 6). This information can be expressed as, for example, a number of samples to be added or removed, where a negative value for indicating removal of samples and a positive value denotes an addition of samples. In other embodiments the synchronization request information could be indicated by, as an example, a duration in milliseconds. The actual synchronization step used by the decoder 60 is typically case dependent. In any event, the decoder 60 selects a most suitable step length. During voiced speech this step length is preferably but a few samples. As an example, in an EVRC speech codec the maximum shift of a pitch pulse is 0.375 ms (i.e., three samples assuming an 8 kHz sample rate), whereas during unvoiced speech a somewhat longer step length can be tolerated. In general, the selection of the appropriate time-warping algorithm executed by time-warping block 68 depends on, for example, the coder design constraints including complexity and a maximum allowable delay. A most straightforward time-warping algorithm simply removes speech samples from, or adds speech samples to, low-energy portions of speech according to the synchronization information. However, this approach does not generally permit large shifts in speech within a small time frame, without experiencing some degradation in the time-warped speech. Perceptually, a more efficient method is based on, for example, an overlap-add algorithm, which on the other hand requires relaxed delay constraints. Overall, the selection and operation of a most appropriate time warping algorithm is system (coder) specific, as can be appreciated by those skilled in the art when guided by the foregoing teachings.

It can be noted that if synchronization of several milliseconds is requested, it is preferable to perform the time-warping process in a series of smaller steps to minimize the possibility of introducing speech quality degradation. It is also within the scope of the teachings of this invention to employ, at least in part, the frame classification approach presented in the above-referenced commonly assigned U.S. patent application Ser. No. 10/189,068, filed Jul. 2, 2002, entitled "Method and Apparatus for Reducing Synchronization Delay in Packet-Based Voice Terminals by Resynchronizing During Talk Spurts", by Ari Lakaniemi, Jari Selin and Pasi Ojala, to allow, by example, the use of longer synchronization steps during subjectively less important segments of speech, and to use shorter synchronization steps during the subjectively more important voiced speech and transient speech.

In a second embodiment of this invention, i.e., one directed towards use with parametric speech coding, the synchronization process for all speech segments is simpler because there is no feedback loop in the coding model. This property enables a more straightforward modification of the speech signal, and the reconstruction process in the decoder only. In this invention, an adaptation of the frame length Nin the speech decoder according to the received synchronization information is used. The resulting speech decoding model is then defined as shown in Equation (10) in FIG. 7, where $N_w$ is the modified frame length.

In general, the amount of the modification, i.e., the difference between the $N_w$ and N, is defined by the same method as in the case of CELP coding, as discussed above. Equation (10) in FIG. 7, and the following paragraph, define the technical modification to the parametric speech decoder. This approach results in the situation depicted in FIG. 5, where the upper diagram represents the synthesized speech signal with frame length N, and the bottom diagram depicts a situation with the modified frame length $N_w$ ($N_w$>N).

As described in the previous sections of this invention, the sinusoidal model and its modified version can be applied either to the speech signal itself or to the LP residual signal. The interpolation process used in parametric coders, in general, guarantees smooth signal behavior and thus a high speech quality, regardless of (moderate) frame length modifications. The modified frame length defines also the interpolation interval. The modification of the interpolation interval can thus be interpreted as one technique for accomplishing the time-warping of the speech signal to achieve (re-)synchronization.

The methods and apparatus described above can be used either in a VoIP terminal, where the speech is decoded and played back for the human user, or in a gateway-type of device where speech arriving from a packet switched network is required to decoded and transcoded to some other coding format for further transmission (e.g., to the Public Switched Telephone Network).

It should be noted that although a discussion has been made of the use of this invention for (re-)synchronization purposes, the teachings of this invention can also be directly applied for speech modification, e.g., in conjunction with adaptive jitter buffer control algorithms.

A most efficient, and hence presently preferred implementation is to integrate the above-described synchronization functionality as part of the speech decoder. The advantage of this approach is the direct access that can be had to the speech decoder parameters, which can then be directly used as part of the time-warping technique.

As was noted above, and as non-limiting examples, the apparatus and method described above can be embodied within a wireless communications device, such as a mobile telephone, a cellular radiotelephone or a personal communicator, and the packet can be a speech packet received from a radio channel. The apparatus and method described above may also be embodied within a personal computer (PC) based telephony system, an Internet Protocol (IP) telephony gateway, or an IP-to-circuit switched media transcoder. VoIP-enabled devices and terminals can especially benefit from the teachings of this invention. However, the teachings of this invention are not to be construed as being limited to use in only the foregoing exemplary applications, devices and terminals.

Furthermore, while disclosed in the context of transmitting, storing and reproducing voice or speech data, it can be appreciated that these teachings are not limited to only voice or speech data, and that other types of audio data, such as music, may also benefit from the use of the methods and apparatus disclosed herein.

What is claimed is:

1. A method for operating a media system when playing audio data for reducing synchronization delay, comprising:
   generating a synchronization delay adjustment request; and
   in response to the synchronization delay adjustment request, modifying operation of an audio signal decoder to execute a time-warping operation for one of lengthening or shortening a duration of an audio signal frame.

2. A method as in claim 1, where the audio signal decoder comprises a code excited linear prediction (CELP) speech decoder.

3. A method as in claim 2, where the CELP decoder time-warping operation is applied to a reconstructed excitation signal u(k) to derive a time-warped reconstructed signal $u_w(k)$, further comprising feeding the time-warped reconstructed signal $u_w(k)$ to a Linear Predictor (LP) synthesis filter to derive a CELP decoder time-warped output signal $\hat{y}_w(k)$.

4. A method as in claim 1, where the audio signal decoder comprises a parametric speech decoder.

5. A method as in claim 4, where an adaptation of the frame length N in the parametric speech decoder results in the use of a modified frame length $N_w$.

6. A method as in claim 1, where synchronization delay is adjusted incrementally over a plurality of frames, or the synchronization delay is adjusted during one frame.

7. A method as in claim 1, where the audio data comprises packetized speech data that is received through a wireless communications channel.

8. A method as in claim 1, where synchronization delay is adjusted during an unvoiced frame.

9. A method as in claim 1, where the synchronization delay adjustment request is generated by a jitter buffer controller.

10. A method as in claim 9, where the jitter buffer controller determines an average amount of time that a frame resides in a jitter buffer; and adjusts synchronization delay so that the average duration approaches a desired jitter buffer residency duration.

11. A method as in claim 1, where an occurrence of the synchronization delay adjustment request is timed, where possible, to cause synchronization delay to be adjusted during an unvoiced frame.

12. A device that makes packetized and encoded speech data audible to a listener, comprising:
a unit for generating a synchronization delay adjustment request for reducing an amount of synchronization delay; and
a speech decoder, responsive to the synchronization delay adjustment request, for executing a time-warping operation for one of lengthening or shortening a duration of a speech frame.

13. A device as in claim 12, where the speech decoder comprises a code excited linear prediction (CELP) speech decoder.

14. A device as in claim 13, where the CELP decoder time-warping operation is applied to a reconstructed excitation signal u(k) to derive a time-warped reconstructed signal $u_w(k)$, and where the time-warped reconstructed signal $u_w(k)$ is input to a Linear Predictor (LP) synthesis filter to derive a CELP decoder time-warped output signal $\hat{y}_w(k)$.

15. A device as in claim 12, where the speech decoder comprises a parametric speech decoder.

16. A device as in claim 15, where an adaptation of the frame length N in the parametric speech decoder results in the use of a modified frame length $N_w$.

17. A device as in claim 12, where synchronization delay is adjusted incrementally over a plurality of frames, or the synchronization delay is adjusted during one frame.

18. A device as in claim 12, where the packetized encoded speech data is received through a wireless communications channel.

19. A device as in claim 12, where the packetized encoded speech data is used for a voice over IP (VoIP) application.

20. A device as in claim 12, further comprising a jitter buffer for storing speech data and a jitter buffer controller, where said unit that generates the synchronization delay adjustment request comprises said jitter buffer controller.

21. A device as in claim 20, where the jitter buffer controller determines an average amount of time that a frame resides in the jitter buffer; and adjusts synchronization delay so that the average duration approaches a desired jitter buffer residency duration.

22. A device as in claim 12, where the unit that generates the synchronization delay adjustment request, where possible, operates to cause synchronization delay to be adjusted during an unvoiced frame.

23. A wireless communications device, comprising
a receiver configured to receive encoded audio data; and
a decoder of said received encoded audio data, said decoder operating in response to generation of a synchronization request to execute a time-warping operation to one of lengthen or shorten a duration of a speech frame.

24. A wireless communication device as in claim 23, where the decoder comprises a code excited linear prediction (CELP) decoder, and where a CELP decoder time-warping operation is applied to a reconstructed excitation signal u(k) to derive a time-warped reconstructed signal $u_w(k)$, and where the time-warped reconstructed signal $u_w(k)$ is input to a Linear Predictor (LP) synthesis filter to derive a CELP decoder time-warped output signal $\hat{y}_w(k)$.

25. A wireless communication device as in claim 23, where the decoder comprises a parametric decoder, and where an adaptation of the frame length N in the parametric decoder results in the use of a modified frame length $N_w$.

26. A wireless communication device as in claim 23, where the received encoded audio data comprises speech data.

27. A wireless communication device as in claim 23, where the received encoded audio data comprises packetized VoIP speech data.

28. A wireless communication device as in claim 23, where the received encoded audio data comprises music.

29. A wireless communication device as in claim 23, further comprising a jitter buffer and a jitter buffer controller, where said synchronization request is generated by said jitter buffer controller.

30. A wireless communication device as in claim 23, further comprising a jitter buffer and a jitter buffer controller, where said synchronization request is generated by said jitter buffer controller in response to a determination based at least in part on an amount of time that audio data resides in the jitter buffer.

31. A decoder comprising:
a first interface configured to receive packetized encoded speech data;
a second interface configured to receive a synchronization delay adjustment request; and
a code excited linear prediction (CELP) decoder configured to execute a time-warping operation for one of lengthening or shortening a duration of a speech frame;
where, responsive to the synchronization delay adjustment request, the CELP decoder time-warping operation is applied to a reconstructed excitation signal u(k) to derive a time-warped reconstructed signal $u_w(k)$, and where the time-warped reconstructed signal $u_w(k)$ is input to a Linear Predictor (LP) synthesis filter to derive a CELP decoder time-warped output signal $\hat{y}_w(k)$.

32. A decoder as in claim 31, where synchronization delay is adjusted incrementally over a plurality of frames, or the synchronization delay is adjusted during one frame.

33. A decoder as in claim 31, where the packetized encoded speech data is received through a wireless communications channel.

34. A decoder as in claim 31, where the packetized encoded speech data is used for a voice over IP (VoIP) application.

35. A method comprising:
receiving a synchronization delay adjustment request; and
modifying operation of an audio signal decoder to execute a time-warping operation for one of lengthening or shortening a duration of an audio signal frame;
where the audio signal decoder comprises a code excited linear prediction (CELP) decoder and further where the CELP decoder time-warping operation is applied to a reconstructed excitation signal u(k) to derive a time-warped reconstructed signal $u_w(k)$, further comprising feeding the time-warped reconstructed signal $u_w(k)$ to a Linear Predictor (LP) synthesis filter to derive a CELP decoder time-warped output signal $\hat{y}_w(k)$.

36. A method as in claim 35, where synchronization delay is adjusted incrementally over a plurality of frames, or the synchronization delay is adjusted during one frame.

37. A method as in claim 35, where the audio data comprises packetized speech data that is received through a wireless communications channel.

* * * * *